L. F. SMITH.
DRAFT-EQUALIZER.
No. 170,690. Patented Dec. 7, 1875.
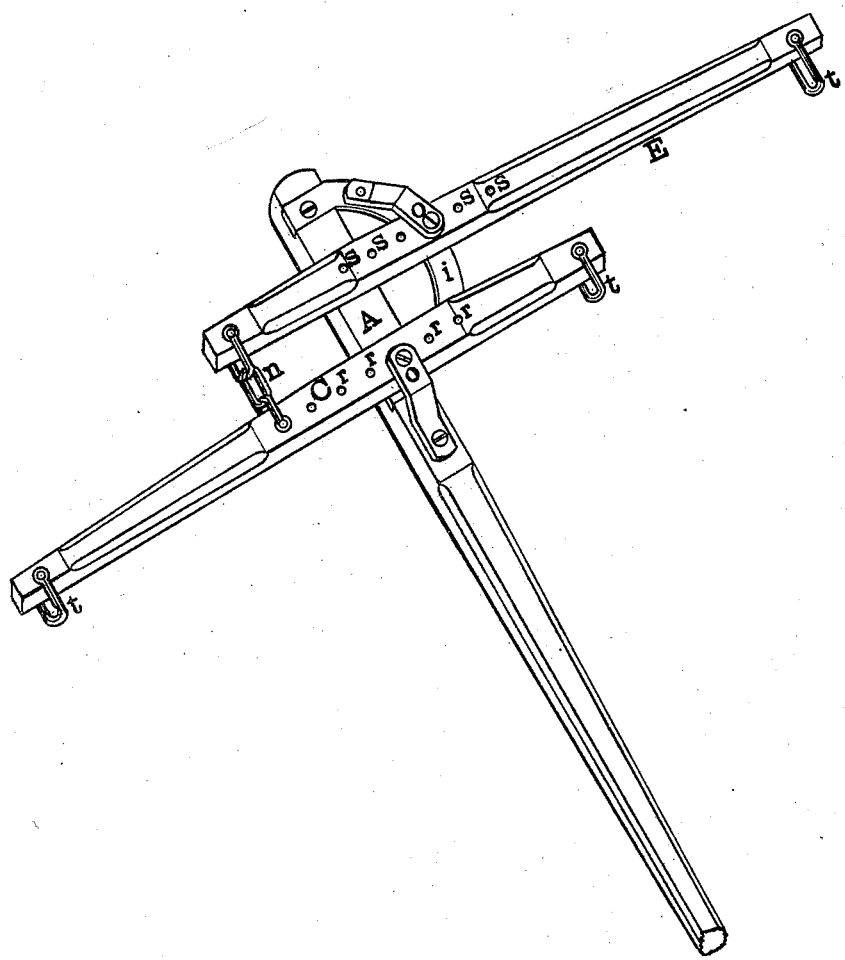
WITNESSES.
Thos. J. Price
W. O. Thomas
INVENTOR.
L. F. Smith

UNITED STATES PATENT OFFICE.

LEWIS F. SMITH, OF MACOMB, ILLINOIS.

IMPROVEMENT IN DRAFT-EQUALIZERS.

Specification forming part of Letters Patent No. 170,690, dated December 7, 1875; application filed July 31, 1875.

*To all whom it may concern:*

Be it known that I, LEWIS F. SMITH, of Macomb, in the county of McDonough and State of Illinois, have invented a new and useful Improvement in Three-Horse Double-Trees; and I do hereby declare that the following is a full, clear, and exact description, which will enable others skilled in the art to make and use the same, reference being had to the annexed drawing making a part of this specification.

My invention relates to that class of double-trees adapted to the working of three horses abreast; and its novelty consists in the arrangement of two levers, each provided with a series of holes, whereby the draft of three horses of unequal strength can be equalized.

In the drawing, A represents the tongue, to which the lever C and the circuiting-plate $i$ are attached. E represents a lever, somewhat similar to the lever C, and is attached to the circuiting-plate $i$, and is also attached to the lever C, at $n$, by link. Each lever is provided with a series of holes, marked $r\ r\ r$ and $s\ s\ s$.

The operation is as follows: Single-trees are attached to the clevises $t\ t\ t$, (not shown,) to which the draft-horses are hitched; and if the horses are of unequal strength the weak horse can be hitched to the lever E. Then the proper adjustment is made by drawing the fulcrum-pins $o\ o$, and place them in different holes until the proper amount of leverage is given to the weak horse that is required. If there are two weak horses and one strong, the strong horse can be hitched to the lever E. Then, by changing the fulcrum-pins $o\ o$, so as to give less leverage, the same result is obtained; or, if the horses are all of unequal strength, in the same manner the fulcrum-pins $o\ o$ can be changed to different holes, so as to give each horse the amount of draft that his strength will permit.

I am aware that devices have been used for equalizing the draft of three horses abreast when of equal strength; but I am not aware that any arrangement of devices has been used whereby the draft of three horses abreast of unequal strength has been equalized in the manner as herein set forth.

Having thus fully described my invention, what I claim as new, and desire to secure by Letters Patent, is—

The combination of the lever C and lever E, each provided with a series of holes, $r\ r\ r$ and $s\ s\ s$, with the circling-plate $i$ and fulcrum-pins $o\ o$, as and for the purpose set forth.

LEWIS F. SMITH.

Witnesses:
   THOS. J. PRICE,
   W. O. THOMAS.